United States Patent
Gu et al.

(10) Patent No.: US 10,218,820 B2
(45) Date of Patent: Feb. 26, 2019

(54) METHOD AND APPARATUS FOR PROCESSING DATA PACKET BASED ON PARALLEL PROTOCOL STACK INSTANCES

(71) Applicant: Huawei Technologies Co., Ltd., Shenzhen (CN)

(72) Inventors: Qiang Gu, Beijing (CN); Liufei Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 260 days.

(21) Appl. No.: 15/222,741

(22) Filed: Jul. 28, 2016

(65) Prior Publication Data
US 2016/0337482 A1    Nov. 17, 2016

Related U.S. Application Data

(63) Continuation of application No. PCT/CN2014/091727, filed on Nov. 20, 2014.

(30) Foreign Application Priority Data

Jan. 29, 2014    (CN) .......................... 2014 1 0043932

(51) Int. Cl.
  *G06F 15/173*    (2006.01)
  *H04L 29/06*    (2006.01)
  *H04L 29/08*    (2006.01)
(52) U.S. Cl.
  CPC ............ *H04L 69/162* (2013.01); *H04L 67/10* (2013.01)
(58) Field of Classification Search
  CPC .............................. H04L 69/162; H04L 67/10
  (Continued)

(56) References Cited

U.S. PATENT DOCUMENTS 6,757,731 B1    6/2004    Barnes et al.
7,715,428 B2    5/2010    Basso et al.
(Continued)

FOREIGN PATENT DOCUMENTS

CN    101415025 A    4/2009
CN    101656677 A    2/2010
(Continued)

OTHER PUBLICATIONS

StachPool: A high-performance scalable architecture on multi-core servers by Qiang Gu et al. ; 2013 IEEE International Conference.*
(Continued)

*Primary Examiner* — Frantz B Jean
(74) *Attorney, Agent, or Firm* — Conley Rose, P.C.

(57) ABSTRACT

A method and an apparatus for processing a data packet based on parallel protocol stack instances and the method includes determining a distribution policy of a data packet according to distribution policy information of a network adapter, determining a first protocol stack instance according to the distribution policy of the data packet, and creating a target socket in the first protocol stack instance such that when the data packet is distributed to the first protocol stack instance, the first protocol stack instance performs protocol processing on the data packet using the target socket. Hence, a case in which a protocol stack instance that is specified for the target socket by an application conflicts with a protocol stack instance specified by a network adapter is avoided, and a technical problem that protocol processing cannot be performed on the data packet is resolved.

20 Claims, 4 Drawing Sheets

(58) Field of Classification Search
USPC .................................. 709/203, 230, 223
See application file for complete search history.

(56) References Cited

U.S. PATENT DOCUMENTS

| | | | |
|---|---|---|---|
| 7,822,025 B1* | 10/2010 | Joly ..................... | H04L 45/245 370/389 |
| 7,885,257 B2 | 2/2011 | Droux et al. | |
| 8,230,090 B2 | 7/2012 | Fan et al. | |
| 8,849,972 B2 | 9/2014 | Tsym | |
| 2004/0078377 A1* | 4/2004 | Begg ................. | G06F 17/30557 |
| 2005/0050202 A1* | 3/2005 | Aiken, Jr. ............. | G06F 9/5033 709/227 |
| 2005/0276281 A1 | 12/2005 | Jones | |
| 2006/0023718 A1* | 2/2006 | Joly ..................... | H04L 45/245 370/392 |
| 2007/0242671 A1 | 10/2007 | Christenson et al. | |
| 2008/0031267 A1* | 2/2008 | Imao .................... | H04L 69/16 370/401 |
| 2008/0181245 A1 | 7/2008 | Basso et al. | |
| 2011/0096664 A1* | 4/2011 | Petry ................... | G06F 15/16 370/231 |
| 2015/0156250 A1* | 6/2015 | Varshney ............. | H04L 69/18 709/201 |

FOREIGN PATENT DOCUMENTS

| | | |
|---|---|---|
| CN | 101741832 A | 6/2010 |
| CN | 101931584 A | 12/2010 |
| CN | 201805555 U | 4/2011 |
| CN | 102523208 A | 6/2012 |
| CN | 102769575 A | 11/2012 |
| CN | 102904729 A | 1/2013 |
| EP | 1385313 A1 | 1/2004 |

OTHER PUBLICATIONS

Partial English Translation and Abstract of Chinese Patent Application No. CN101415025, Apr. 22, 2009, 23 pages.
Partial English Translation and Abstract of Chinese Patent Application No. CN101656677, Feb. 24, 2010, 16 pages.
Partial English Translation and Abstract of Chinese Patent Application No. CN101931584, Dec. 29, 2010, 10 pages.
Partial English Translation and Abstract of Chinese Patent Application No. CN102523208, Jun. 27, 2012, 11 pages.
Gu, Q., et al., "StackPool: A High-Performance Scalable Network Architecture on Multi-Core Servers," XP032606211, IEEE International Conference on High Performance Computing and Communications, 2013, pp. 17-28.
Zec M., et al., "Implementing a Clonable Network Stack in the FreeBSD Kernel," Proceedings of the 2003 USENIX Annual Technical COonference, 2003, pp. 137-150.
Shalev, L., et al., "IsoStack—Highly Efficient Network Processing on Dedicated Cores," Jun. 23-25, 2010, 14 pages.
Foreign Communication From a Counterpart Application, European Application No. 14880886.8, Extended European Search Report dated Nov. 16, 2017, 8 pages.
Foreign Communication From a Counterpart Application, PCT Application No. PCT/CN2014/091727, English Translation of International Search Report dated Feb. 17, 2015, 2 pages.
Foreign Communication From a Counterpart Application, PCT Application No. PCT/CN2014/091727, English Translation of Written Opinion dated Feb. 17, 2015, 5 pages.

* cited by examiner

METHOD AND APPARATUS FOR PROCESSING DATA PACKET BASED ON PARALLEL PROTOCOL STACK INSTANCES

CROSS-REFERENCE TO RELATED APPLICATIONS

This application is a continuation of International Application No. PCT/CN2014/091727, filed on Nov. 20, 2014, which claims priority to Chinese Patent Application No. 201410043932.4, filed on Jan. 29, 2014, both of which are hereby incorporated by reference in their entireties.

TECHNICAL FIELD

The present disclosure relates to the communications technologies, and in particular, to a method and an apparatus for processing a data packet based on parallel protocol stack instances.

BACKGROUND

As cloud computing develops rapidly, a higher requirement is imposed on a processing capability of a protocol stack instance. Currently, because a manner in which multiple protocol stack instances share a socket is usually used, there exists a problem that multiple protocol stack instances contend for one socket, and therefore, parallel protocol stack instances in a multi-core central processing unit (CPU) architecture are put forward. The parallel protocol stack instances include at least two protocol stack instances, and each protocol stack instance runs on a virtual central processing unit (VCPU) of a CPU, and uses a manner of exclusively occupying a socket associated with the protocol stack instance, to avoid the foregoing problem that multiple protocol stack instances contend for one socket. When a network adapter distributes data packets to protocol stack instances according to a distribution policy, the protocol stack instances may perform protocol processing in parallel on the data packets using sockets associated with the protocol stack instances.

However, when an application instructs to create a socket needed to perform the foregoing protocol processing, the application specifies an association relationship between a socket and a protocol stack instance. In this way, only an associated protocol stack instance can occupy the socket to perform protocol processing on a data packet, and when a protocol stack instance to which a network adapter distributes a data packet is different from a protocol stack instance associated with the socket, that is, a case in which a protocol stack instance specified by an application conflicts with a protocol stack instance specified by a network adapter occurs, protocol processing cannot be performed on the data packet.

SUMMARY

Embodiments of the present disclosure provide a method and an apparatus for processing a data packet based on parallel protocol stack instances.

According to a first aspect, a method for processing a data packet based on parallel protocol stack instances is provided, including obtaining distribution policy information of a network adapter, determining a distribution policy of a data packet according to the distribution policy information, and determining a first protocol stack instance according to the distribution policy of the data packet when an instruction of an application to create a target socket is obtained by means of listening, and creating the target socket in the first protocol stack instance such that the first protocol stack instance performs protocol processing on the data packet using the target socket.

In a first possible implementation manner of the first aspect, the distribution policy information includes a distribution policy of the network adapter.

With reference to the first possible implementation manner of the first aspect, in a second possible implementation manner of the first aspect, where the distribution policy information further includes at least one of hardware configuration information and software configuration information. Determining a distribution policy of a data packet according to the instruction policy information includes adjusting the distribution policy of the network adapter according to the hardware configuration information and/or the software configuration information, to determine the distribution policy of the data packet, and the method further includes writing the distribution policy of the data packet into the network adapter such that the network adapter distributes the data packet to the first protocol stack instance according to the distribution policy of the data packet.

With reference to the first aspect, in a third possible implementation manner of the first aspect, before determining a first protocol stack instance according to the distribution policy of the data packet, and before creating the target socket in the first protocol stack instance, the method further includes identifying a manner that is indicated by the application and that is used when the target socket is created. Furthermore, determining a first protocol stack instance according to the distribution policy of the data packet, and creating the target socket in the first protocol stack instance includes determining the first protocol stack instance according to the distribution policy of the data packet, and creating the target socket in the first protocol stack instance if the manner used is a manner of calling a connect function.

With reference to the first aspect, in a fourth possible implementation manner of the first aspect, before determining a first protocol stack instance according to the distribution policy of the data packet, and before creating the target socket in the first protocol stack instance, the method further includes identifying a manner that is indicated by the application and that is used when the target socket is created, creating the target socket in all protocol stack instances included in the parallel protocol stack instances if the manner used is a manner of calling a bind function and/or a manner of calling a listen function. Furthermore, determining a first protocol stack instance according to the distribution policy of the data packet, and creating the target socket in the first protocol stack instance includes obtaining, by means of listening, a transmission control protocol (TCP) connection establishment success indication sent by a protocol stack instance in the protocol stack instances in which the target socket has been created, determining the first protocol stack instance according to the distribution policy of the data packet, and creating the target socket in the first protocol stack instance.

With reference to the fourth possible implementation manner of the first aspect, in a fifth possible implementation manner of the first aspect, before obtaining, by means of listening, a TCP connection establishment success indication sent by a protocol stack instance in the protocol stack instances in which the target socket has been created, the method further includes performing, by a protocol stack instance that receives the data packet of the TCP type, protocol processing on the data packet of the TCP type if a data packet of a TCP type is received and no TCP connection establishment success indication is obtained by means of listening.

With reference to the fourth possible implementation manner of the first aspect, in a sixth possible implementation manner of the first aspect, after creating the target socket in all protocol stack instances included in the parallel protocol stack instances, the method further includes performing, by a protocol stack instance that receives a data packet of a user datagram protocol (UDP) type, protocol processing on the data packet of the UDP type if the data packet of the UDP type is received.

In a seventh possible implementation manner of the first aspect, after the instruction of the application to create the target socket is obtained by means of listening, the method further includes sending, to the application, a pseudo result that the target socket has been created.

According to a second aspect, an apparatus for processing a data packet based on parallel protocol stack instances is provided, including an obtaining module configured to obtain distribution policy information of a network adapter, a determining module configured to determine a distribution policy of a data packet according to the distribution policy information, and a first creation module configured to determine a first protocol stack instance according to the distribution policy of the data packet when an instruction of an application to create a target socket is obtained by means of listening, and create the target socket in the first protocol stack instance such that the first protocol stack instance performs protocol processing on the data packet using the target socket.

In a first possible implementation manner of the second aspect, the distribution policy information includes a distribution policy of the network adapter.

With reference to the first possible implementation manner of the second aspect, in a second possible implementation manner of the second aspect, where the distribution policy information further includes at least one of hardware configuration information and software configuration information, where the determining module is further configured to adjust the distribution policy of the network adapter according to the hardware configuration information and/or the software configuration information, to determine the distribution policy of the data packet, and the apparatus further includes an adapter writing module configured to write the distribution policy of the data packet into the network adapter such that the network adapter distributes the data packet to the first protocol stack instance according to the distribution policy of the data packet.

With reference to the second aspect, in a third possible implementation manner of the second aspect, the apparatus further includes an identification module configured to identify a manner that is indicated by the application and that is used when the target socket is created, and the first creation module is configured to determine the first protocol stack instance according to the distribution policy of the data packet, and create the target socket in the first protocol stack instance if the manner used is a manner of calling a connect function.

With reference to the second aspect, in a fourth possible implementation manner of the second aspect, the apparatus further includes an identification module configured to identify a manner that is indicated by the application and that is used when the target socket is created, and a second creation module configured to create the target socket in all protocol stack instances included in the parallel protocol stack instances if the manner used is a manner of calling a bind function and/or a manner of calling a listen function, where the first creation module is configured to obtain, by means of listening, a TCP connection establishment success indication sent by a protocol stack instance in the protocol stack instances in which the target socket has been created, determine the first protocol stack instance according to the distribution policy of the data packet, and create the target socket in the first protocol stack instance.

With reference to the fourth possible implementation manner of the second aspect, in a fifth possible implementation manner of the second aspect, the apparatus further includes a first processing module configured to, before the TCP connection establishment success indication sent by a protocol stack instance in the protocol stack instances in which the target socket has been created is obtained by means of listening, perform, protocol processing on a data packet of a TCP type if the data packet of the TCP type is received and no TCP connection establishment success indication is obtained by means of listening.

With reference to the fourth possible implementation manner of the second aspect, in a sixth possible implementation manner of the second aspect, the apparatus further includes a second processing module configured to perform protocol processing on a data packet of a UDP type if the data packet of the UDP type is received after the target socket is created in all protocol stack instances included in the parallel protocol stack instances.

With reference to the second aspect, in a seventh possible implementation manner of the second aspect, the apparatus further includes a sending module configured to send, to the application, a pseudo result that the target socket has been created.

The embodiments of the present disclosure provide the method and apparatus for processing a data packet based on parallel protocol stack instances. A distribution policy of a data packet is determined according to distribution policy information of a network adapter, and a first protocol stack instance is determined according to the distribution policy of the data packet, and a target socket is created in the first protocol stack instance such that when the data packet is distributed to the first protocol stack instance, the first protocol stack instance performs protocol processing on the data packet using the target socket. In this way, a case in which a protocol stack instance that is specified for the target socket by an application conflicts with a protocol stack instance specified by a network adapter is avoided, and a technical problem that protocol processing cannot be performed on the data packet is resolved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
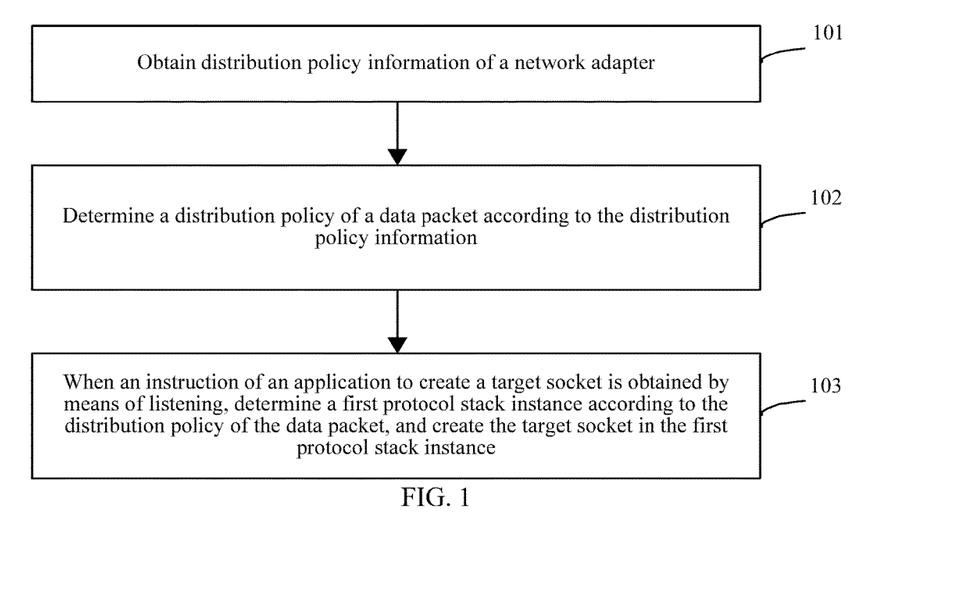
FIG. 1 is a schematic flowchart of a method for processing a data packet based on parallel protocol stack instances according to an embodiment of the present disclosure.

FIG. 1 is a schematic flowchart of a method for processing a data packet based on parallel protocol stack instances according to an embodiment of the present disclosure. As shown in FIG. 1, this embodiment may include the following steps.

Step 101: Obtain distribution policy information of a network adapter.

The distribution policy information includes a distribution policy of the network adapter.

Optionally, the distribution policy information of the network adapter may be obtained from the network adapter, and the network adapter may be a physical network adapter or a virtual network adapter.

The distribution policy information may further include hardware configuration information and/or software configuration information.

Step 102: Determine a distribution policy of a data packet according to the distribution policy information.

The distribution policy of the data packet is used to indicate a first protocol stack instance to which the data packet is distributed.

Optionally, the distribution policy of the network adapter is adjusted according to the hardware configuration information if the distribution policy information includes the distribution policy of the network adapter, and further includes the hardware configuration information and/or the software configuration information, for example, a quantity of hardware queues included by the network adapter, and/or the software configuration information, for example, whether a forwarding function of a protocol stack instance is enabled, to determine the distribution policy of the data packet. Correspondingly, after the distribution policy of the data packet is determined, the distribution policy of the data packet is written into the network adapter such that the network adapter distributes the data packet to the first protocol stack instance according to the distribution policy of the data packet.

Step 103: When an instruction of an application to create a target socket is obtained by means of listening, determine a first protocol stack instance according to the distribution policy of the data packet, and create the target socket in the first protocol stack instance.

The target socket is a socket needed to perform protocol processing on the data packet.

Optionally, when it is obtained, by means of listening, that the application instructs to create the target socket, a manner that is indicated by the application and that is used when the target socket is created may be further identified. If the manner used is a manner of calling a connect function, it is determined that the application is currently in a client mode, it is determined, according to the distribution policy of the data packet, that the data packet is to be distributed to the first protocol stack instance, and the target socket is created in the first protocol stack instance such that when the data packet is distributed to the first protocol stack instance, the first protocol stack instance performs protocol processing on the data packet using the target socket.

Alternatively, optionally, when it is obtained, by means of listening, that the application instructs to create the target socket, a manner that is indicated by the application and that is used when the target socket is created may be further identified. If the manner used is a manner of calling a bind function and/or a manner of calling a listen function, it is determined that the application is currently in a server mode, and in this case, the target socket is created in all protocol stack instances included in the parallel protocol stack instances. When a TCP connection establishment success indication sent by a second protocol stack instance in the protocol stack instances in which the target socket has been created is obtained by means of listening, it is determined, according to the distribution policy of the data packet, that the data packet is to be distributed to the first protocol stack instance, and the target socket is created in the first protocol stack instance.

In this embodiment, a distribution policy of a data packet is determined according to distribution policy information of a network adapter, and a first protocol stack instance is determined according to the distribution policy of the data packet, and a target socket is created in the first protocol stack instance such that when the data packet is distributed to the first protocol stack instance, the first protocol stack instance performs protocol processing on the data packet using the target socket. In this way, a case in which a protocol stack instance that is specified for the target socket by an application conflicts with a protocol stack instance specified by a network adapter is avoided, and a technical problem that protocol processing cannot be performed on the data packet is resolved.

Figure 2:
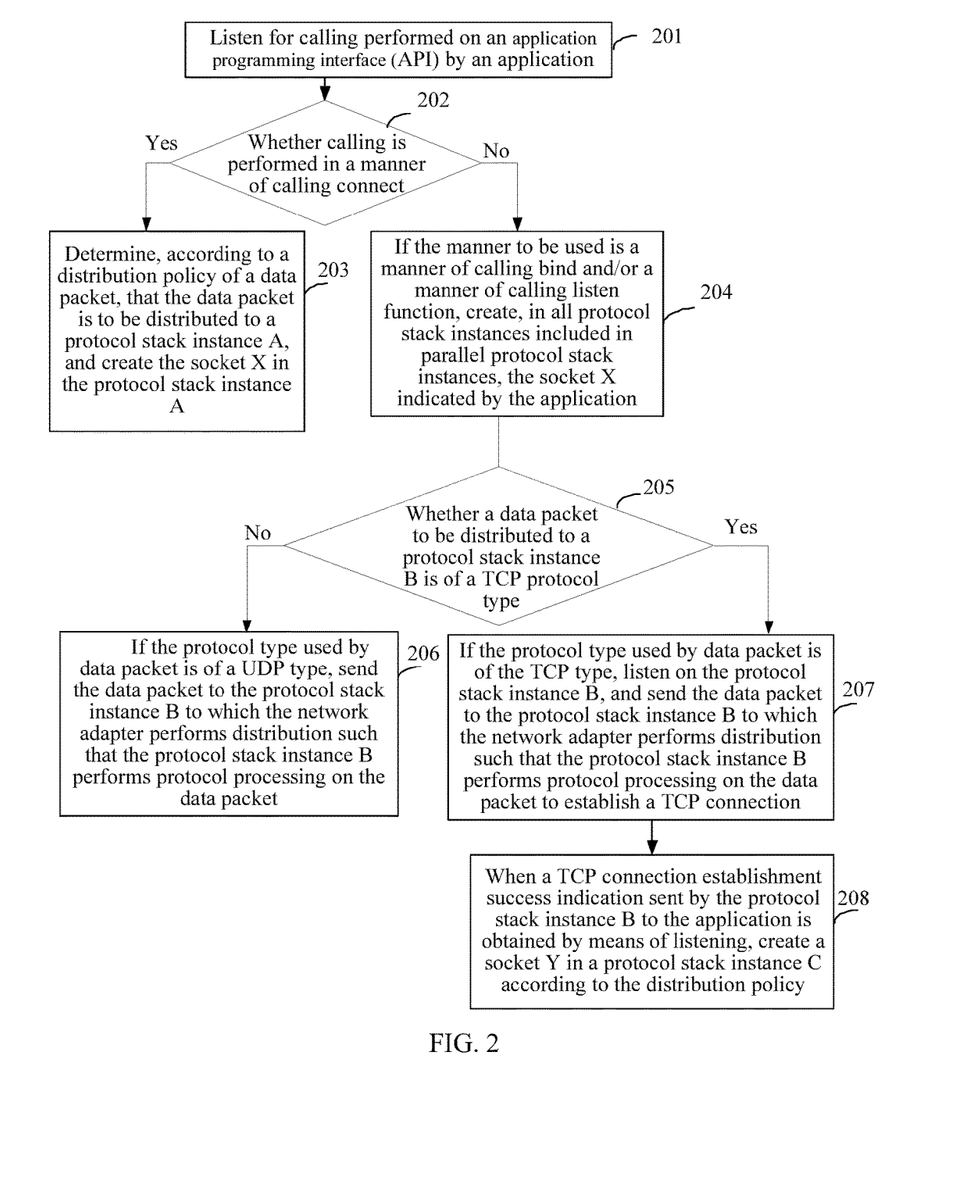
FIG. 2 is a schematic flowchart of a method for processing a data packet based on parallel protocol stack instances according to another embodiment of the present disclosure.

FIG. 2 is a schematic flowchart of a method for processing a data packet based on parallel protocol stack instances according to another embodiment of the present disclosure. In this embodiment, parallel protocol stack instances are configured to perform protocol processing on a data packet distributed by a network adapter, and the method provided in this embodiment is executed by a data packet processing apparatus in parallel protocol stack instances. As shown in FIG. 2, this embodiment may include Step 201: Listen for calling performed on an application programming interface (API) by an application.

Step 202: When it is obtained, by means of listening, that the application calls an API to instruct to create a socket X, determine whether a manner that is indicated by the application and that is used when the socket X is created is a manner of calling a connect function, and perform step 203 if the manner is a manner of calling a connect function, or perform step 204 if the manner is not a manner of calling a connect function.

X is a number of a logical port bound with the socket. The socket X is used to perform protocol processing on a data packet.

Further, when it is obtained, by means of listening, that the application calls the API to instruct to create the socket X, if the application instructs a specified protocol stack instance in parallel protocol stack instances to create the socket X, it may be further determined, according to a network running status of the parallel protocol stack instances, whether the socket X can be created, for example, whether a total quantity of sockets created in the specified protocol stack instance reaches a preset threshold, and/or whether a logical port X bound with the socket that the application instructs to create has been occupied. A pseudo result that the socket has been created is returned to the application if the total quantity does not reach the preset threshold and the logical port is not occupied. Returning a pseudo result refers to that instead of actually creating a socket in a protocol stack instance, the pseudo result is returned to the application to notify the application of whether the socket is successfully created. An operation of creating the socket is performed subsequently.

Step 203: Determine, according to a distribution policy of a data packet, that the data packet is to be distributed to a protocol stack instance A, and create the socket X in the protocol stack instance A if the manner used is a manner of calling a connect function.

The distribution policy of the data packet is predetermined according to distribution policy information of a network adapter after the distribution policy information of the network adapter is obtained, and the distribution policy of the data packet has been written into the network adapter such that the network adapter distributes the data packet to the protocol stack instance A according to the distribution policy of the data packet. A distribution policy of a data packet is used to indicate a protocol stack instance to which the data packet is distributed, and generally, a data packet is distributed according to quintuple information in the data packet. The distribution policy information includes a distribution policy of the network adapter, and the distribution policy information further includes at least one of hardware configuration information and software configuration information.

Optionally, if the manner used is the manner of calling a connect function, the application is in a client mode, the distribution policy of the data packet is determined according to the distribution policy of the network adapter, to determine the protocol stack instance A to which the data packet, on which protocol processing needs to be performed using the socket X, is distributed, and create the socket X in the protocol stack instance A in a manner of deploying a protocol control block (PCB).

Step 204: If the manner used is a manner of calling a bind function and/or a manner of calling a listen function, create, in all protocol stack instances included in parallel protocol stack instances, the socket X indicated by the application.

Optionally, if the manner used is the manner of calling a bind function and/or the manner of calling a listen function, it may be determined that the socket X is in the server mode, and quintuple information in data packets that need to be processed using the socket X has a same destination port and a same destination Internet Protocol (IP) address, but source ports and source IP addresses in the quintuple information are not necessarily the same. Therefore, generally, the network adapter distributes, to all the protocol stack instances based on distribution policies of data packets and according to quintuple information in the data packets, the data packets that need to be processed using the socket X. Therefore, the socket X indicated by the application is created in all the protocol stack instances included in the parallel protocol stack instances.

Step 205: Receive a data packet that is to be distributed to a protocol stack instance B by a network adapter, determine whether a protocol type used by the data packet to be distributed to the protocol stack instance B is a TCP type, and perform step 207 if the protocol type used by the data packet is a TCP type, or perform step 206 if the protocol type used by the data packet is not a TCP type.

The protocol stack instance B is a protocol stack instance in the protocol stack instances in which the socket X has been created.

Step 206: If the protocol type used by the data packet is of a UDP type, send the data packet to the protocol stack instance B to which the network adapter performs distribution such that the protocol stack instance B performs protocol processing on the data packet.

Optionally, if the protocol type is a UDP type, a protocol stack instance that receives the data packet of the UDP type performs protocol processing on the data packet of the UDP type.

Step 207: If the protocol type used by the data packet is of the TCP type, listen on the protocol stack instance B, and send the data packet to the protocol stack instance B to which the network adapter performs distribution such that the protocol stack instance B performs protocol processing on the data packet to establish a TCP connection.

Optionally, if the protocol type is the TCP type, that is, the data packet of the TCP type is received, the data packet is used to instruct to create a TCP connection between a client and a server end, and in this case, the application is in the server mode, and protocol processing is performed on the data packet to establish the TCP connection, that is, the TCP connection is enabled to enter a TCP accept state. If the data packet of the TCP type is received, and before the data packet of the TCP type is received, no TCP connection establishment success indication is obtained by means of listening, a protocol stack instance that receives the data packet of the TCP type performs protocol processing on the data packet of the TCP type. In addition, the protocol stack instance B is listened on, to obtain a TCP connection establishment success indication sent by the protocol stack instance B to the application.

Step 208: When a TCP connection establishment success indication sent by the protocol stack instance B to the application is obtained by means of listening, create a socket Y in a protocol stack instance C according to the distribution policy.

Y is a number of a logical port bound with the socket created in the protocol stack instance C, and the socket Y is used to perform protocol processing on a TCP data packet transmitted using the TCP connection.

Optionally, after the TCP connection is established, the protocol stack instance B sends the TCP connection establishment success indication to the application. In this way, the protocol stack instance C to which the TCP data packet is distributed is determined according to the distribution policy when the indication is obtained by means of listening, and the socket Y is created in the protocol stack instance C such that when the TCP data packet is distributed to the protocol stack instance C, the protocol stack instance C performs protocol processing on the TCP data packet using the socket Y. The TCP data packet is a data packet transmitted using the TCP connection.

In this embodiment, a distribution policy of a data packet is determined according to distribution policy information of a network adapter, and a first protocol stack instance is determined according to the distribution policy of the data packet, and a target socket is created in the first protocol stack instance such that when the data packet is distributed to the first protocol stack instance, the first protocol stack instance performs protocol processing on the data packet using the target socket. In this way, a case in which a protocol stack instance that is specified for the target socket by an application conflicts with a protocol stack instance specified by a network adapter is avoided, and a technical problem that protocol processing cannot be performed on the data packet is resolved.

Figure 3:
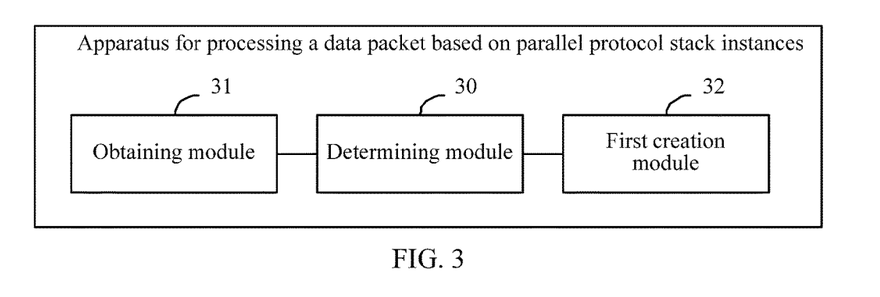
FIG. 3 is a schematic structural diagram of an apparatus for processing a data packet based on parallel protocol stack instances according to an embodiment of the present disclosure.

FIG. 3 is a schematic structural diagram of an apparatus for processing a data packet based on parallel protocol stack instances according to an embodiment of the present disclosure. As shown in FIG. 3, the apparatus for processing a data packet based on parallel protocol stack instances includes an obtaining module 31, a determining module 30, and a first creation module 32.

The obtaining module 31 is configured to obtain distribution policy information of a network adapter.

The distribution policy information includes a distribution policy of the network adapter.

The determining module 30 is connected to the obtaining module 31, and is configured to determine a distribution policy of a data packet according to the distribution policy information.

The distribution policy of the data packet is used to indicate a first protocol stack instance to which the data packet is distributed.

Optionally, the determining module 30 is configured to adjust the distribution policy of the network adapter according to hardware configuration information and/or software configuration information, to determine the distribution policy of the data packet if the distribution policy information further includes at least one of the hardware configuration information and the software configuration information.

The first creation module 32 is connected to the determining module 30, and is configured to determine a first protocol stack instance according to the distribution policy of the data packet, and create the target socket in the first protocol stack instance such that the first protocol stack instance performs protocol processing on the data packet using the target socket when an instruction of an application to create a target socket is obtained by means of listening.

In this embodiment, a distribution policy of a data packet is determined according to distribution policy information of a network adapter, and a first protocol stack instance is determined according to the distribution policy of the data packet, and a target socket is created in the first protocol stack instance such that the first protocol stack instance performs protocol processing on the data packet using the target socket when the data packet is distributed to the first protocol stack instance. In this way, a case in which a protocol stack instance that is specified for the target socket by an application conflicts with a protocol stack instance specified by a network adapter is avoided, and a technical problem that protocol processing cannot be performed on the data packet is resolved.

Figure 4A:
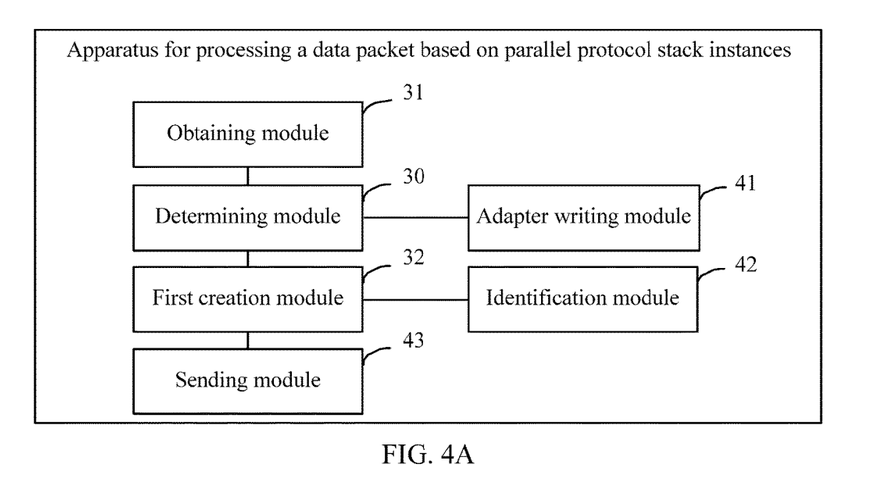
FIG. 4A is a schematic structural diagram of an apparatus for processing a data packet based on parallel protocol stack instances according to another embodiment of the present disclosure.

FIG. 4A is a schematic structural diagram of an apparatus for processing a data packet based on parallel protocol stack instances according to another embodiment of the present disclosure. As shown in FIG. 4A, based on the foregoing embodiment, the distribution policy information includes the distribution policy of the network adapter, and further includes at least one of hardware configuration information and software configuration information, the apparatus for processing a data packet based on parallel protocol stack instances in this embodiment further includes an adapter writing module 41, an identification module 42, and a sending module 43.

The adapter writing module 41 is connected to the determining module 30, and is configured to write the distribution policy of the data packet into the network adapter such that the network adapter distributes the data packet to the first protocol stack instance according to the distribution policy of the data packet.

The sending module 43 is connected to the first creation module 32, and is configured to send, to the application, a pseudo result that the target socket has been created. Returning a pseudo result refers to that, instead of actually creating a socket in a protocol stack instance, the pseudo result is returned to the application to notify the application of whether the socket is successfully created. An operation of creating the socket is performed subsequently.

The identification module 42 is connected to the first creation module 32, and is configured to identify a manner that is indicated by the application and that is used when the target socket is created.

On this basis, optionally, the first creation module 32 is configured to determine to distribute the data packet to the first protocol stack instance according to the distribution policy of the data packet, and create the target socket in the first protocol stack instance if the manner used is a manner of calling a connect function.

Figure 4B:
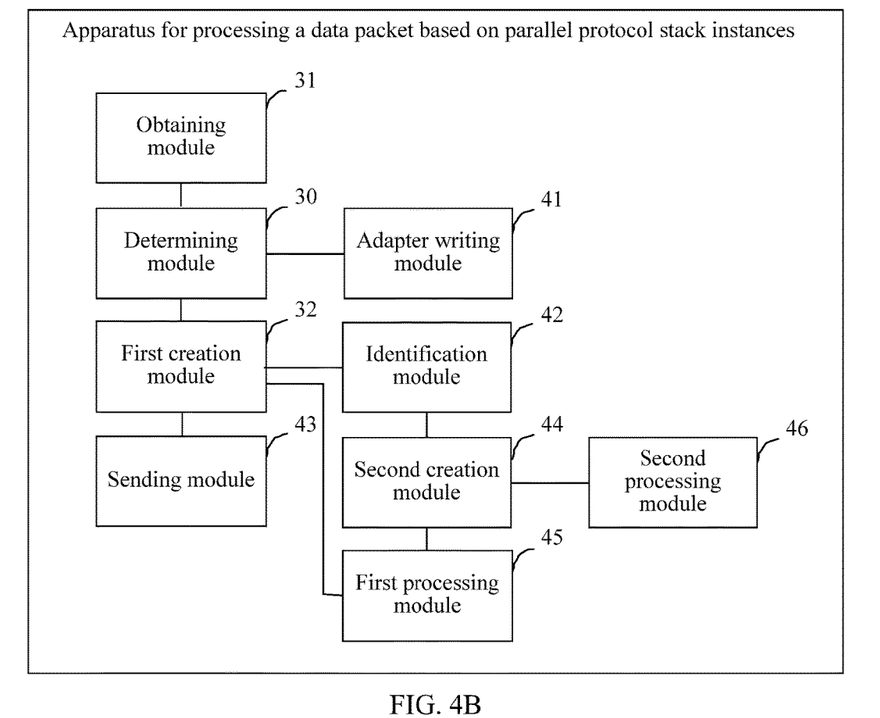
FIG. 4B is a schematic structural diagram of another apparatus for processing a data packet based on parallel protocol stack instances according to another embodiment of the present disclosure.

Further, FIG. 4B is a schematic structural diagram of another apparatus for processing a data packet based on parallel protocol stack instances according to another embodiment of the present disclosure. Based on the apparatus for processing a data packet based on parallel protocol stack instances shown in FIG. 4A, the apparatus for processing a data packet based on parallel protocol stack instances further includes a second creation module 44, a first processing module 45, and a second processing module 46.

The second creation module 44 is connected to the identification module 42, and is configured to create the target socket in all protocol stack instances included in the parallel protocol stack instances if the manner used is a manner of calling a bind function and/or a manner of calling a listen function.

On this basis, optionally, the first creation module 32 is configured to obtain, by means of listening, a TCP connection establishment success indication sent by a protocol stack instance in the protocol stack instances in which the target socket has been created, determine the first protocol stack instance according to the distribution policy of the data packet, and create the target socket in the first protocol stack instance.

The first processing module 45 is connected to the second creation module 44 and the first creation module 32, and is configured to, before the TCP connection establishment success indication sent by a protocol stack instance in the protocol stack instances in which the target socket has been created is obtained by means of listening, perform, protocol processing on the data packet of the TCP type if a data packet of a TCP type is received and no TCP connection establishment success indication is obtained by means of listening.

The second processing module 46 is connected to the second creation module 44, and is configured to perform, protocol processing on a data packet of a UDP type if the data packet of the UDP type is received after the target socket is created in all protocol stack instances included in the parallel protocol stack instances.

The functional modules of the other apparatus for processing a data packet based on parallel protocol stack instances provided in this embodiment may be configured to execute the procedures of the methods for processing a data packet based on parallel protocol stack instances shown in FIG. 1 and FIG. 2. A specific working principle thereof is not described in detail again, and for details, refer to the description in the method embodiments.

In this embodiment, a distribution policy of a data packet is determined according to distribution policy information of a network adapter, and a first protocol stack instance is determined according to the distribution policy of the data packet, and a target socket is created in the first protocol stack instance such that when the data packet is distributed to the first protocol stack instance, the first protocol stack instance performs protocol processing on the data packet using the target socket. In this way, a case in which a protocol stack instance that is specified for the target socket by an application conflicts with a protocol stack instance specified by a network adapter is avoided, and a technical problem that protocol processing cannot be performed on the data packet is resolved.

Figure 5:
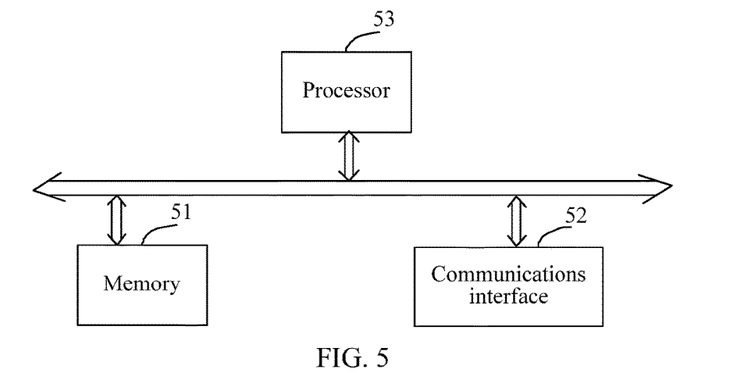
FIG. 5 is a schematic structural diagram of an apparatus for processing a data packet based on parallel protocol stack instances according to still another embodiment of the present disclosure.

FIG. 5 is a schematic structural diagram of an apparatus for processing a data packet based on parallel protocol stack instances according to still another embodiment of the present disclosure. As shown in FIG. 5, the apparatus in this embodiment may include a memory 51, a communications interface 52, and a processor 53.

The memory 51 is configured to store a program. The program may include program code, and the program code includes a computer operation instruction. The memory 51 may include a high-speed random-access memory (RAM), and may further include a non-volatile memory, for example, at least one magnetic disk storage.

The communications interface 52 is configured to obtain distribution policy information of a network adapter, where the distribution policy information includes a distribution policy of the network adapter, and the distribution policy information further includes at least one of hardware configuration information and software configuration information.

Optionally, the communications interface 52 is configured to obtain hardware configuration information and software configuration information of the network adapter, and the distribution policy of the network adapter such that the processor 53 adjusts the distribution policy of the network adapter according to the hardware configuration information and/or the software configuration information, to obtain a distribution policy of a data packet. After the communications interface 52 obtains the distribution policy of the data packet from the processor 53, the communications interface 52 writes the distribution policy into the network adapter such that the network adapter distributes the data packet to a first protocol stack instance according to the distribution policy of the data packet.

The processor 53 is configured to execute the program stored in the memory 51, to be configured to determine the distribution policy of the data packet according to the distribution policy information, and determine the first protocol stack instance according to the distribution policy of the data packet, and create the target socket in the first protocol stack instance such that the first protocol stack instance performs protocol processing on the data packet using the target socket when an instruction of an application to create a target socket is obtained by means of listening.

Optionally, the processor 53 is configured to adjust the distribution policy of the network adapter according to the hardware configuration information and/or the software configuration information, to obtain the distribution policy of the data packet. When the communications interface 52 obtains, by means of listening, that the application instructs to create the target socket, a manner that is indicated by the application and that is used when the target socket is created is identified. If the manner used is a manner of calling a connect function, the application is in a client mode, and in this case, it is determined, according to the distribution policy, that the target data packet is to be distributed to the first protocol stack instance, and the target socket is created in the first protocol stack instance.

Optionally, the processor 53 is configured to adjust the distribution policy of the network adapter according to the hardware configuration information and/or the software configuration information, to obtain the distribution policy of the data packet. When the communications interface 52 obtains, by means of listening, that the application instructs to create the target socket, a manner that is indicated by the application and that is used when the target socket is created is identified. If the manner used is a manner of calling a bind function and/or a manner of calling a listen function, the application is in a server mode, and in this case, the target socket is created in all protocol stack instances included in parallel protocol stack instances. When a TCP connection establishment success indication sent by a second protocol stack instance in the protocol stack instances in which the target socket has been created is obtained by means of listening, it is determined, according to the distribution policy, that the data packet is to be distributed to the first protocol stack instance, and the target socket is created in the first protocol stack instance. If a data packet of a UDP type is received, a protocol stack instance that receives the data packet of the UDP type performs protocol processing on the data packet of the UDP type, and a protocol stack instance that receives the data packet of the TCP type performs protocol processing on the data packet of the TCP type if a data packet of a TCP type is received and no TCP connection establishment success indication is obtained by means of listening.

On this basis, the communications interface 52 is further configured to listen for the instruction of the application and the indication sent by the second protocol stack instance, and after obtaining, by means of listening, that the application instructs to create the target socket, the communications interface 52 sends, to the application, a pseudo result that the target socket has been created. Returning a pseudo result refers to that, instead of actually creating a socket in a protocol stack instance, the pseudo result is returned to the application to notify the application of whether the socket is successfully created. An operation of creating the socket is performed subsequently.

The functional modules of the apparatus for processing a data packet based on parallel protocol stack instances provided in this embodiment may be configured to execute the procedures of the methods for processing a data packet based on parallel protocol stack instances shown in FIG. 1 and FIG. 2. A specific working principle thereof is not described in detail again, and for details, refer to the description in the method embodiments.

In this embodiment, a distribution policy of a data packet is determined according to distribution policy information of a network adapter, and a first protocol stack instance is determined according to the distribution policy of the data packet, and a target socket is created in the first protocol stack instance such that when the data packet is distributed to the first protocol stack instance, the first protocol stack instance performs protocol processing on the data packet using the target socket. In this way, a case in which a protocol stack instance that is specified for the target socket by an application conflicts with a protocol stack instance specified by a network adapter is avoided, and a technical problem that protocol processing cannot be performed on the data packet is resolved.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for processing a data packet, comprising:
   determining a distribution policy for a plurality of data packets according to a distribution policy information of a network adapter that distributes the data packets;
   assigning the distribution policy to the network adapter;
   monitoring a first instruction of a first application to create a first target socket for processing a first data packet;
   determining, in a plurality protocol stack instances, a first protocol stack instance according to the distribution policy;
   creating the first target socket in the first protocol stack instance;
   receiving the first data packet from the network adapter, the first data packet being distributed to the first protocol stack instance according to the distribution policy; and
   performing, by the first protocol stack instance, protocol processing on the first data packet using the first target socket.

2. The method of claim 1, wherein the distribution policy information comprises a network adapter distribution policy.

3. The method of claim 2, wherein the distribution policy information further comprises hardware configuration information and software configuration information, and determining the distribution policy for the data packets comprises adjusting the distribution policy of the network adapter according to the hardware configuration information and the software configuration information to determine the distribution policy of the data packets.

4. The method of claim 2, wherein the distribution policy information further comprises hardware configuration information, and determining the distribution policy for the data packets of comprises adjusting the distribution policy of the network adapter according to the hardware configuration information to determine the distribution policy of the data packets.

5. The method of claim 2, wherein the distribution policy information further comprises software configuration information, and determining the distribution policy for the data packets comprises adjusting the distribution policy of the network adapter according to the software configuration information to determine the distribution policy of the data packets.

6. The method of claim 1, further comprising identifying that a manner, indicated by the first application, for creating the first target socket is calling a connect function before determining the first protocol stack instance.

7. The method of claim 1, comprising:
   monitoring a second instruction of a second application to create a second target socket;
   identifying that a manner, indicated by the second application, for creating the second target socket is calling a bind function or calling a listen function;
   creating the second target socket in each of the protocol stack instances;
   receiving a second data packet from the network adapter, the second data packet being distributed to a second protocol stack instance in the protocol stack instances according to the distribution policy;
   performing, by the second protocol stack instance with the second target socket, protocol processing on the second data packet;
   obtaining, by listening to the second protocol stack instance, an indication indicating a success in establishing a transmission control protocol (TCP) connection via the second target socket;
   determining, according to the distribution policy for the data packets and in the protocol stack instances, a third protocol stack instance for processing data packets of the TCP connection.

8. The method of claim 7, wherein before obtaining the indication indicating the success in establishing the TCP connection, the method further comprises:
   receiving a third data packet from the network adapter, the third data packet being distributed to the first protocol stack instance according to the distribution policy, the third data packet being a TCP data packet; and
   performing, by the first protocol stack instance, protocol processing on the third data packet.

9. The method of claim 7, further comprising:
   receiving a fourth data packet from the network adapter, the fourth data packet being distributed to the second protocol stack instance according to the distribution policy, the fourth data packet being a user datagram protocol (UDP) data packet; and
   performing, by the second protocol stack instance, protocol processing on the fourth data packet.

10. The method of claim 7, further comprising sending, to the second application, a pseudo result indicating the second target socket has been created after monitoring the second instruction of the second application.

11. An apparatus for processing a data packet, comprising:
    a memory comprising instructions; and
    a processor coupled to the memory, the instructions causing the processor to be configured to:
        determine a distribution policy for a plurality of data packets according to a distribution policy information of a network adapter that distributes the data packets;

assign the distribution policy to the network adapter;
monitor a first instruction of a first application to create a first target socket for processing a first data packet;
determine, in a plurality protocol stack instances, a first protocol stack instance according to the distribution policy;
create the first target socket in the first protocol stack instance;
receive the first data packet from the network adapter, the first data packet being distributed to the first protocol stack instance according to the distribution policy; and
perform, by the first protocol stack instance, protocol processing on the first data packet using the first target socket.

12. The apparatus of claim 11, wherein the distribution policy information comprises a network adapter distribution policy.

13. The apparatus of claim 12, wherein the distribution policy information further comprises hardware configuration information and software configuration information, and the instructions further cause the processor to be configured to adjust the distribution policy of the network adapter according to the hardware configuration information and the software configuration information to determine the distribution policy for the data packets.

14. The apparatus of claim 12, wherein the distribution policy information further comprises of hardware configuration information, and the instructions further cause the processor to be configured to adjust the distribution policy of the network adapter according to the hardware configuration information to determine the distribution policy for the data packets.

15. The apparatus of claim 12, wherein the distribution policy information further comprises software configuration information, and the instructions further cause the processor to be configured to adjust the distribution policy of the network adapter according to the software configuration information to determine the distribution policy for the data packets.

16. The apparatus of claim 11, wherein the instructions further cause the processor to be configured to identify that a manner, indicated by the first application, for creating the first target socket is calling a connect function.

17. The apparatus of claim 11, wherein the instructions further cause the processor to be configured to:
monitor a second instruction of a second application to create a second target socket;
identify that a manner, indicated by the second application, for creating the second target socket is calling a bind function or calling a listen function;
create the second target socket in each of the protocol stack instances;
receive a second data packet from the network adapter, the second data packet being distributed to a second protocol stack instance in the protocol stack instances according to the distribution policy;
perform, using the second protocol stack instance with the second target socket, protocol processing on the second data packet;
obtain, by listening to the second protocol stack instance, an indication indicating a success for establishing a transmission control protocol (TCP) connection via the second target socket; and
determine, according to the distribution policy of the data packets and in the protocol stack instances, a third protocol stack instance for processing data packets of the TCP connection.

18. The apparatus of claim 17, wherein the instructions further cause the processor to be configured to:
receive a third data packet from the network adapter before obtaining the indication indicating the success for establishing the TCP connection, the third data packet being distributed to the first protocol stack instance according to the distribution policy, the third data packet being a TCP data packet; and
perform protocol processing on the third data packet using the first protocol stack instance.

19. The apparatus of claim 17, wherein the instructions further cause the processor to be configured to:
receive a fourth data packet from the network adapter, the fourth data packet being distributed to the second protocol stack instance according to the distribution policy, the fourth data packet being a user datagram protocol (UDP) data packet; and
perform protocol processing on the fourth data packet using the second protocol stack instance.

20. The apparatus of claim 17, wherein the instructions further cause the processor to be configured to send, to the second application, a pseudo result indicating the second target socket has been created after monitoring the second instruction of the second application.

* * * * *

UNITED STATES PATENT AND TRADEMARK OFFICE
CERTIFICATE OF CORRECTION

PATENT NO. : 10,218,820 B2
APPLICATION NO. : 15/222741
DATED : February 26, 2019
INVENTOR(S) : Qiang Gu and Liufei Wen It is certified that error appears in the above-identified patent and that said Letters Patent is hereby corrected as shown below:

On the Title Page

Item (30), Line 1: "201410043932" should read "201410043932.4"

In the Claims

Column 14, Line 16: insert --further-- before "comprising"

Column 15, Line 28: "comprises of hardware" should read "comprises hardware"

Signed and Sealed this
Twenty-third Day of April, 2019

Andrei Iancu
*Director of the United States Patent and Trademark Office*